US009194390B1

(12) United States Patent
Ruiter et al.

(10) Patent No.: US 9,194,390 B1
(45) Date of Patent: Nov. 24, 2015

(54) PUMP TESTER

(71) Applicant: PRONK TECHNOLOGIES, INC., Sun Valley, CA (US)

(72) Inventors: Karl A. Ruiter, Honolulu, HI (US); Mirik Hovsepian, Sunland, CA (US)

(73) Assignee: PRONK TECHNOLOGIES, INC., Sun Valley, CA (US)

( * ) Notice: Subject to any disclaimer, the term of this patent is extended or adjusted under 35 U.S.C. 154(b) by 300 days.

(21) Appl. No.: 13/949,072

(22) Filed: Jul. 23, 2013

(51) Int. Cl.
*G01F 1/00* (2006.01)
*F04B 51/00* (2006.01)
*G01F 25/00* (2006.01)
*G01F 1/84* (2006.01)

(52) U.S. Cl.
CPC .............. *F04B 51/00* (2013.01); *G01F 1/8436* (2013.01); *G01F 25/0023* (2013.01)

(58) Field of Classification Search
None
See application file for complete search history.

(56) References Cited

U.S. PATENT DOCUMENTS

| 4,382,753 | A | * | 5/1983 | Archibald | 417/479 |
| 4,857,048 | A | * | 8/1989 | Simons et al. | 604/503 |
| 5,056,992 | A | * | 10/1991 | Simons et al. | 417/474 |
| 5,769,608 | A | * | 6/1998 | Seale | 417/53 |
| 9,011,379 | B2 | * | 4/2015 | Hariharesan et al. | 604/153 |
| 2003/0086790 | A1 | * | 5/2003 | Ma | 417/209 |
| 2005/0249606 | A1 | * | 11/2005 | Rush | 417/53 |
| 2009/0031797 | A1 | * | 2/2009 | Das | 73/227 |
| 2011/0224920 | A1 | * | 9/2011 | Ruiter et al. | 702/45 |
| 2014/0116110 | A1 | * | 5/2014 | Katase | 73/19.01 |

FOREIGN PATENT DOCUMENTS

JP 2014084753 A * 5/2014

* cited by examiner

*Primary Examiner* — Andre Allen
(74) *Attorney, Agent, or Firm* — Brooks Acordia IP Law, P.C.; Pejman Yedidsion; Christopher Weiss

(57) ABSTRACT

Methods of and devices for testing medical pumps via tracking induced bubble trajectories within a fluid flow conduit comprising a valve and methods of synchronized corrections of flow data estimates.

18 Claims, 13 Drawing Sheets

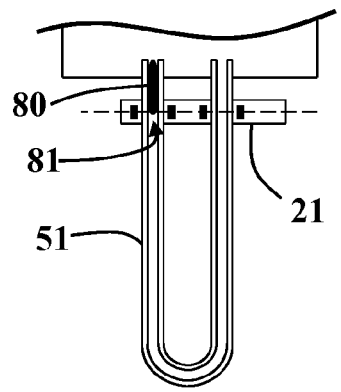
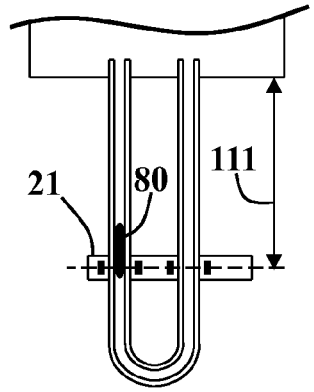
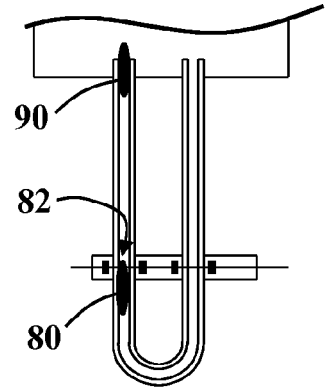
FIG. 6A   FIG. 6B   FIG. 6C
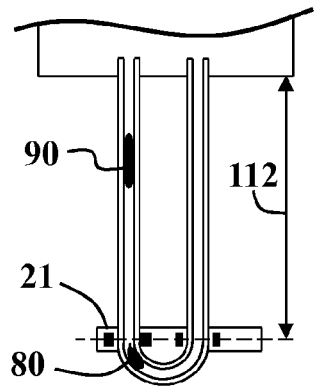
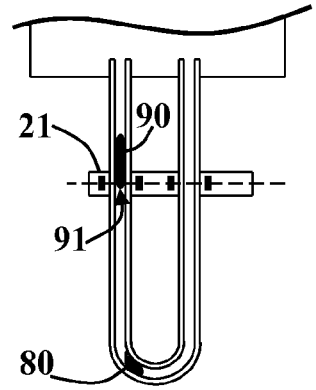
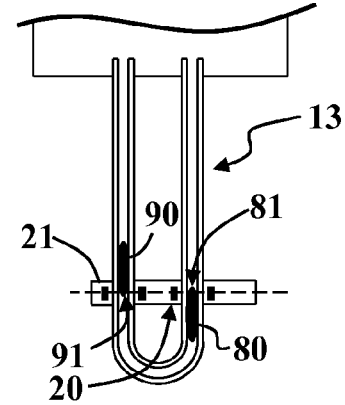
FIG. 6D   FIG. 6E   FIG. 6F
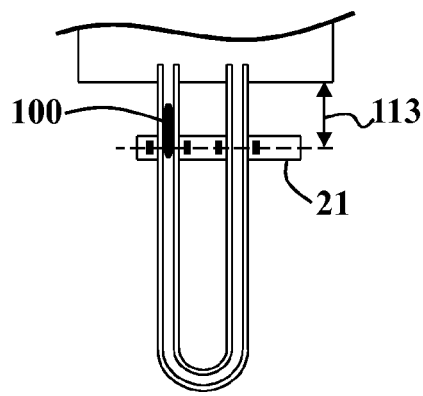
FIG. 6G

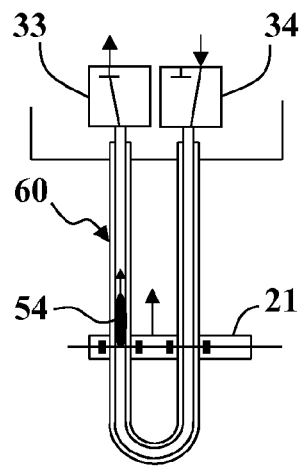
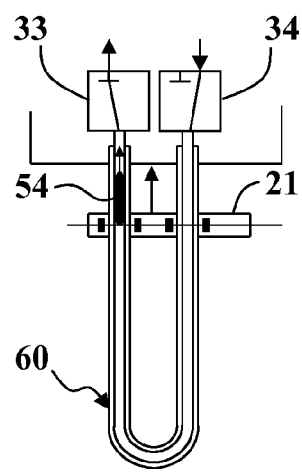
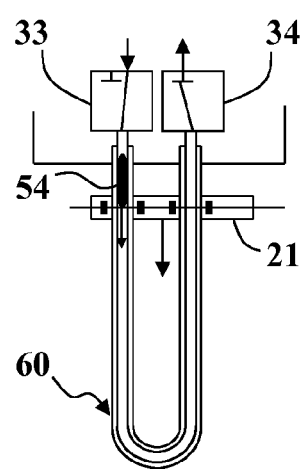
FIG. 8A  FIG. 8B  FIG. 8C
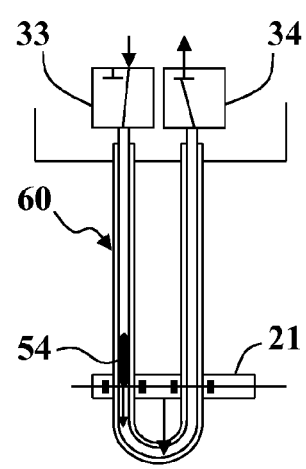
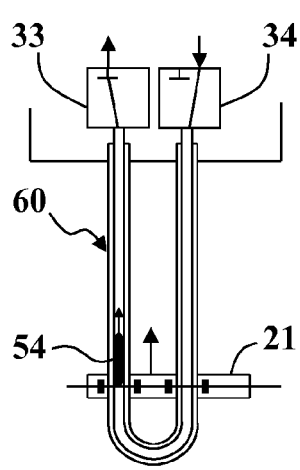
FIG. 8D  FIG. 8E

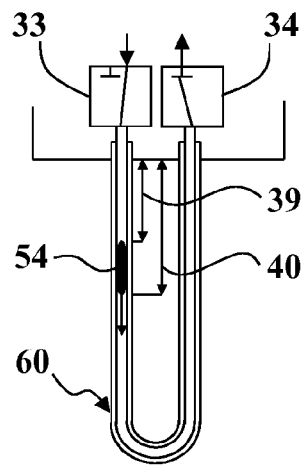
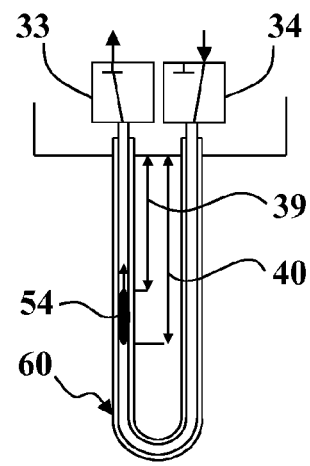
FIG. 9A  FIG. 9C
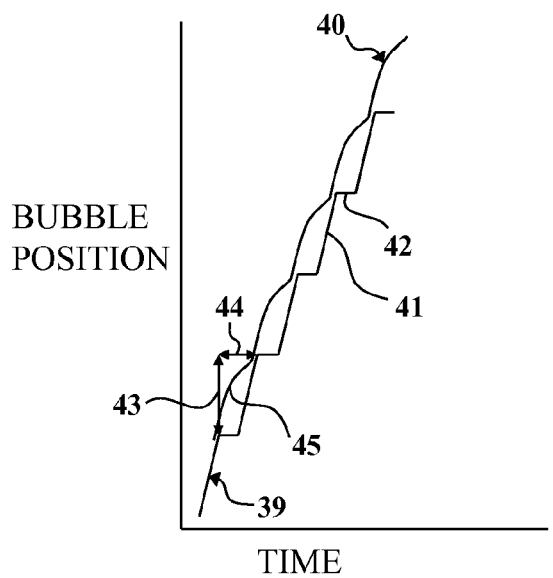
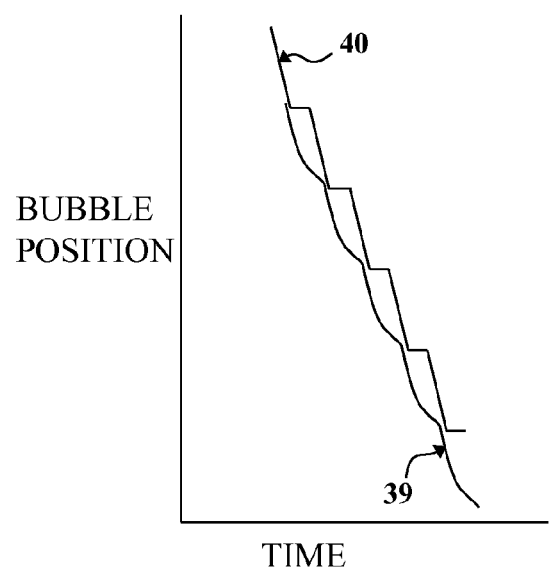
FIG. 9B  FIG. 9D

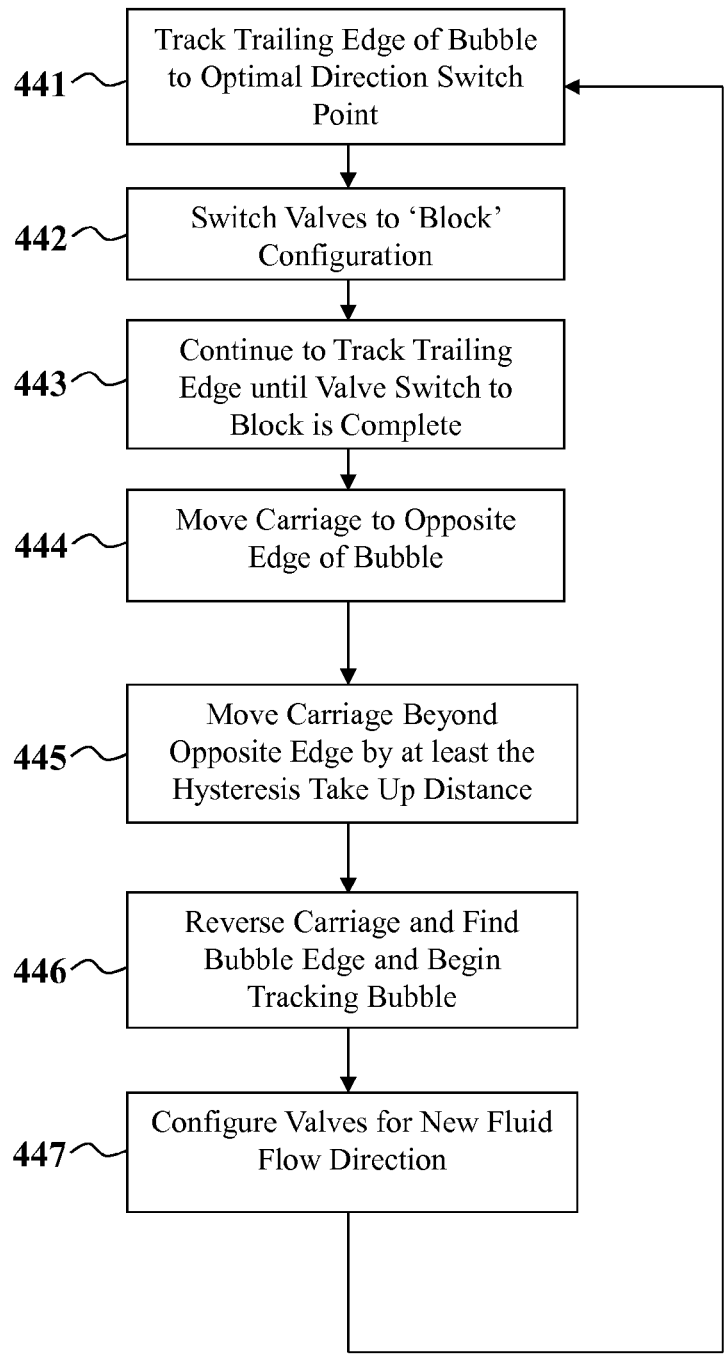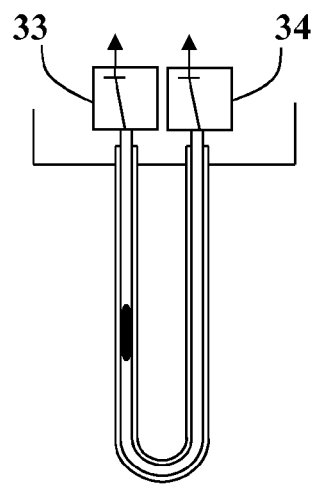
FIG. 10B
FIG. 10A

PUMP TESTER

TECHNICAL FIELD

The present invention, in its several embodiments, comprises methods of, and devices for, testing fluid pumps, and particularly pertains to methods of, and devices for, testing medical pumps.

BACKGROUND ART

Modern medical practice utilizes a variety of fluid pumps for diverse applications such as introducing a saline solution into patients to maintain hydration and supplying patient controlled anesthesia. Because of the variety of applications for these pumps, they employ widely different flow rates ranging from a fraction of a milliliter per hour to several liters/hour. Presently devices which measure the flow and volume output of pumps do so by passing the pump fluidic output into a transparent tube and introducing bubbles into the tube. Measurements of flow and volumetric output may be derived by measuring the time required for the bubbles to move past multiple fixed optical sensors. Devices embodying such means of flow measurement are of limited utility for timely measurements because, at low flow rates, a derived flow measurement may require several minutes, several hours, or may require several tens of hours for the bubbles under test to move between points along an array of multiple fixed optical sensors.

DISCLOSURE OF THE INVENTION

The invention, in its several embodiments, may include an exemplary method of fluid flow rate estimation of a pump comprising: (a) detecting a periodic synchronization event, via inserted bubble tracking of a signal processor unit comprising a central processing unit and addressable memory; and (b) synchronizing, based on the periodic synchronization event, either: (i) a flow characteristic calculation, i.e., a determination of a flow characteristic value; or (b) a flow characteristic data display; or (c) both. The signal processor unit may include circuitry and/or a central processing unit and addressable memory. A periodic synchronization event detecting of the exemplary method may comprise: (a) detecting one or more pushes of a pump based on a time-interval and at least one of: a carriage position change and carriage motion; and (b) detecting one or more pauses of a pump based on time-interval, a threshold, and at least one of: a carriage position change and carriage motion. A synchronizing of a flow characteristic calculation based on the periodic synchronization event may comprise: (a) collecting flow data through each push-pause cycle of the pump; and (b) adding, by the signal processing unit, the collected flow data to an average value when a pause is detected following a push detection. An example of the inserted bubble tracking of the method claim may comprise: (a) inserting a first bubble into the fluid flow; and (b) tracking, by the signal processor unit, a travel of at least one of: the leading edge of the inserted first bubble and the trailing edge of the inserted first bubble, the tracking based on photo-detector output of a first photo-detector disposed on a controlled, translatable carriage.

The invention, in its several embodiments, may also include an exemplary pump tester comprising: (a) a light-transmissive fluid conduit comprising an outflow path and an inflow path relative to a manifold configured for bubble insertion; (b) a carriage translatably disposed along at least one of: the outflow path of the conduit and the inflow path of the conduit, where the carriage includes a first light emitting unit and a first photo-receptor; (c) a motor having linkage configured to translate the carriage; and (d) a signal processing unit comprising at least one of: (i) a circuit and (ii) a microprocessor comprising a central processor and addressable memory; the signal processor configured to output motor command signals based on input signals from the first photo-receptor. The linkage of a pump tester may comprise a belt engaging a guide pulley and a drive pulley driven by a motor, wherein the translatable carriage is attached to the belt. The signal processing unit of a pump tester may be further configured, e.g., via circuitry and/or a central processor executing instructions, to: (1) detect, via inserted bubble tracking, one or more pushes of a pump based on a time-interval of carriage motion; (2) detect one or more pauses of a pump based on time-interval of carriage motion less than a threshold; (3) collect flow data through each push-pause cycle of the pump; and (4) add, by a signal processing unit, the collected flow data to an average value when a pause is detected following a push detection.

Embodiments of the present invention include methods of determining and/or measuring fluid flow of a pump via a pump tester having a light-transmissive fluid conduit, where the steps may comprise: (a) inserting a first bubble into the fluid flow; and (b) tracking, by a signal processor unit, the travel of at least one of: the leading edge of the inserted first bubble and the trailing edge of the inserted first bubble, the tracking based on photo-detector output of a first photo-detector disposed on a controlled, translatable carriage. The signal processor unit used to practice the exemplary methods may comprise a central processing unit and addressable memory. An exemplary method may further comprise inserting a second bubble into the fluid flow; and tracking, by a signal processor unit, the travel of at least one of: the leading edge of the inserted second bubble and the trailing edge of the inserted second bubble, the tracking based on at least one of: photo-detector output of the first photo-detector disposed and a second photo-detector, disposed on the controlled, translatable carriage.

Another exemplary method embodiment of the present invention may comprise: (a) providing a translatable carriage having at least one carriage-mounted light-emitter, the carriage disposed about a fluid conduit, the fluid conduit extending from a manifold; (b) inserting a bubble into a fluid of the fluid conduit, the fluid having a flow rate and a direction of flow within the fluid conduit; (c) testing for at least one of: a leading edge and a trailing edge of the bubble, the testing based on a change in received light from the carriage-mounted light-emitter; (d) if the at least one of: a leading edge and a trailing edge of the bubble, is detected, then (i) determining a first carriage position via the carriage-mounted light-emitter, e.g., a topmost carriage position of a vertically mounted pump tester, and (ii) advancing the carriage in the direction of flow to a carriage stopping position, e.g., a bottommost carriage position of a vertically mounted pump tester, (e) returning the carriage in a reverse direction of flow, i.e., in a direction from the stopping position toward the first carriage position; (f) testing for at least one of: a leading edge and a trailing edge of the bubble, the testing based on a change in received light from the carriage-mounted light-emitter; (g) if the at least one of: a leading edge and a trailing edge of the bubble, is detected, then (i) determining a second carriage position, and (ii) invoking a tracking mode based on a difference between the second carriage position, the first carriage position, and the carriage stopping position; and (h) if the at least one of: a leading edge and a trailing edge of the bubble, is not detected, then invoking a first tracking mode. The fluid conduit of the exemplary method may comprise a return portion configured to return the fluid to the manifold, and the first tracking mode may comprise returning the carriage to the first carriage position, and detecting at least one of: a leading edge and a trailing edge of the bubble. If the determined second carriage position is less than one-tenth of a distance between the stopping position and the first carriage position, then the exemplary method may invoke a second tracking mode, where the second tracking mode may comprise detecting a leading edge of the bubble, and slewing the carriage to maintain detection of at least one of the leading edge of the bubble. If the determined second carriage position is less than one-half of a distance between the stopping position and the first carriage position and greater than one-tenth of a distance between the stopping position and the first carriage position, then the exemplary method may invoke a third tracking mode, where the third tracking mode comprises: detecting a trailing edge of the bubble; and slewing the carriage to maintain detection of the trailing edge of the bubble. If the determined second carriage position is greater than one-half of a distance between the stopping position, then invoking a fourth tracking mode, where the fourth tracking mode may comprise: detecting at least one of: a leading edge and a trailing edge of the bubble, slewing the carriage to the stopping position, and detecting at least one of: a leading edge and a trailing edge of the bubble. Another exemplary method embodiment of the present invention may comprise a method of measuring fluid flow by (a) inserting a first bubble into a flow of fluid of a light-transmissive conduit, the conduit having a first portion and a second portion; (b) tracking, by a signal processor unit, the travel of the inserted first bubble in the first portion of the conduit, the tracking based on photo-detector output of a first photo-detector disposed on a controlled, translatable carriage, whereby the second photo-detector may be receiving light emitting diode emissions via the first portion of the conduit; (d) inserting a second bubble into the flow of fluid; (e) detecting the inserted second bubble, based on photo-detector output of the first photo-detector disposed on the controlled, translatable carriage; (f) tracking, by the signal processor unit, the travel of the inserted second bubble, the tracking based on the photo-detector output of the first photo-detector disposed on the controlled, translatable carriage; (g) detecting the inserted first bubble, based on photo-detector output of the second photo-detector disposed on the controlled, translatable carriage, whereby the second photo-detector may be receiving light emitting diode emissions via the second portion of the conduit; and (h) tracking, by the signal processor unit, the travel of the inserted first bubble, the tracking based on the photo-detector output of the second photo-detector disposed on the controlled, translatable carriage.

Another exemplary method embodiment of the present invention may comprise: (a) initiating a fluid flow in a conduit and in a first direction; (b) tracking, by a signal processing unit, a travel of an edge of a bubble present in the fluid flow and moving in the first direction; (c) stopping the fluid flow; (d) initiating the fluid flow in a second direction, where the second direction may be a direction that is a reverse direction of the first direction; and (e) tracking, by the signal processing unit, a travel of the edge of the bubble present in the fluid flow and moving in the second direction. The method may further be where the tracking is by way of measuring the position of the bubble present in the fluid flow. Additionally, the stopping the fluid flow may further comprises: closing at least one valve disposed between an input flow and an output flow. In one embodiment, the at least one value may be a three-way valve. In another exemplary embodiment, the initiating the fluid flow in the first direction may be via energizing a first valve; the stopping the fluid flow may be via de-energizing the first valve; and the initiating the fluid flow in the second direction may be via energizing a second valve.

In one embodiment, tracking the travel of the edge of the bubble may be by a moveable carriage, the moveable carriage comprising at least one light emitting unit. Optionally, the moveable carriage may further comprises at least one photo-receptor, the photo-receptor configured to receive light emitted by the at least one light emitting unit. Additionally, tracking the travel of the edge of the bubble may be by keeping a center point of the moveable carriage aligned with a trailing edge of the bubble, where, optionally, the trailing edge of the bubble is determined as the edge of the bubble closest to the fluid source. In another embodiment, tracking the travel of the edge of the bubble may be by keeping a center point of the moveable carriage aligned with a leading edge of the bubble. Optionally, the leading edge of the bubble is determined as the edge of the bubble farthest to the fluid source. In another exemplary method embodiment, tracking the travel of the edge of the bubble may be by tracking a trailing edge of the bubble via a high-resolution image capturing device. In yet another exemplary method embodiment, tracking the travel of the edge of the bubble may be by tracking a leading edge of the bubble via a high-resolution image capturing device.

Optionally, the method may comprise: (f) detecting, via scanning a portion of the conduit, the presence of one or more bubbles in the conduit; (g) stopping the fluid flow if one or more bubbles are detected in the conduit; and (h) determining, based on the detected one or more bubbles, at least one of: a number representing a total of the one or more bubbles in the conduit; a size of each bubble of the one or more bubbles in the conduit; and a location corresponding to each bubble of the one or more bubbles in relation to other detected bubbles. In another embodiment, the method may further comprise: (i) determining the presence of one or more bubbles in the conduit based on a predefined size threshold; (j) if the one or more detected bubbles have a size outside the predefined size threshold then removing the one or more bubbles from the conduit.

The invention, in its several embodiments, may also include another exemplary pump tester comprising: (a) a light-transmissive fluid conduit; (b) at least one valve disposed between a fluid inlet port and the light-transmissive fluid conduit; (c) at least one imager configured to image at least a portion of the light-transmissive fluid conduit; and (d) a signal processing unit comprising a central processor and addressable memory, the signal processor configured to: (A) output a signal to the at least one valve to effect at least one of: (i) fluid flow from the inlet port through the at least one valve and into the light-transmissive fluid conduit in a first fluid flow direction, (ii) fluid flow blocked in the light-transmissive fluid conduit by the at least one valve, and (iii) fluid flow from the inlet port through the at least one valve and into the light-transmissive fluid conduit in a second fluid flow direction, where the second fluid flow direction is a reverse direction of the first fluid flow direction; and (B) output a signal to the at least one imager to effect at least one of: (i) tracking a travel of an edge of a bubble in the light-transmissive fluid conduit moving in the first fluid flow direction; (ii) switching a tracking position to an opposite side of the bubble when the fluid flow is blocked; and (iii) tracking the travel of the edge of the bubble in the light-transmissive conduit moving in the second fluid flow direction. Optionally, the edge of the bubble may be closest to the fluid source. In another exemplary embodiment, the light-transmissive fluid conduit may be a U-shaped conduit having a first leg and a second leg, where an open end of the first leg and the second leg of the U-shaped conduit may be configured to mate into a manifold on the pump tester via two or more O-rings, and where the U-shaped conduit may be removed for cleaning.

BRIEF DESCRIPTION OF DRAWINGS

Embodiments of the present invention are illustrated by way of example and not limitation in the figures of the accompanying drawings, and in which:

FIGS. 6A-6G each depict exemplary travel positions of a first induced bubble and/or second induced bubble of a two-bubble embodiment of the present invention;

FIGS. 8A-8E each depict exemplary bubble positions in another exemplary embodiment of the present invention;

FIG. 9A depicts the motion of a bubble where fluid flows through a bubble tube in a counter-clockwise position;

FIG. 9B depicts, in a plot of bubble position vs. time, the positions of both ends of the bubble of FIG. 9A;

FIG. 9C depicts the motion of a bubble where fluid flows through a bubble tube in a clockwise position;

FIG. 9D depicts, in a plot of bubble position vs. time, the positions of both ends of the bubble of FIG. 9C;

FIG. 10A is an exemplary top-level flowchart of an exemplary process for switching the edge of a bubble to be tracked;

FIG. 10B depicts an exemplary blocked valve configuration;

DETAILED DESCRIPTION

Figure 1:
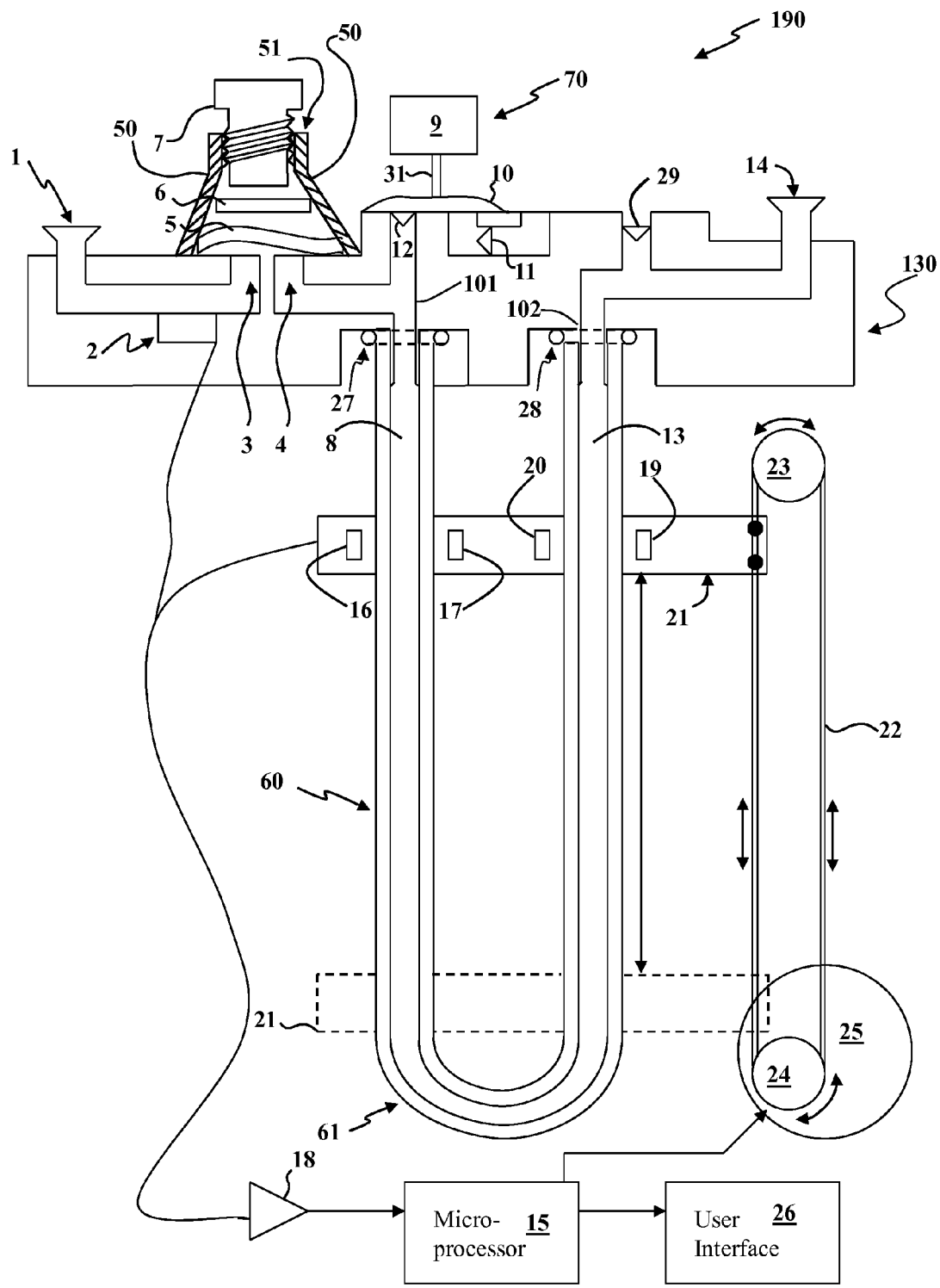
FIG. 1 depicts, in a functional arrangement, an exemplary apparatus embodiment of the present invention.

A schematic diagram of an exemplary device embodiment of the present invention is shown in FIG. 1. Fluid from the pump to be tested enters the device (190) though the inlet port (1). The fluid may then be ducted past a pressure sensor unit (2) that measures the pressure, and the pressure sensor unit (2) may include a sensor to measure the temperature of the fluid.

The fluid may then be ducted to the inlet port (3) of an occlusion valve (50), and may flow to the outlet port (4) of the occlusion valve (50) by displacing an elastomeric diaphragm (5). Deflection of the elastomeric diaphragm (5) may be opposed by pressure from a resilient foam rubber spring (6), in which pressure may be modified by adjusting a screw (7) engaging a threaded collar (51) of the occlusion valve (50). A pressure sensor may be placed proximate to the occlusion value and pressure sensors may be placed along the fluid conduit. Output, i.e., sensed pressure, may be transmitted to the signal processor, which may be a microprocessor (15).

Fluid passing through the occlusion valve (50) may then be ducted to an outbound and return fluid conduit assembly such as a U-shaped bubble tube (60). A bubble pump (70) having an actuator (9) may cause motion (e.g., via a mechanical connection (31)) of the bubble pump diaphragm (10), which may cause air to move through the bubble pump inlet valve (11) and then though the bubble pump outlet valve (12), and then into the bubble tube (60).

Fluid and bubbles may travel down the first leg (8) of the bubble tube (60) of the fluid conduit, around the bend (61) then up the second leg (13) of the bubble tube (60) of the fluid conduit, and the fluid and bubbles may then be ducted to the outlet port (14).

Figure 2:
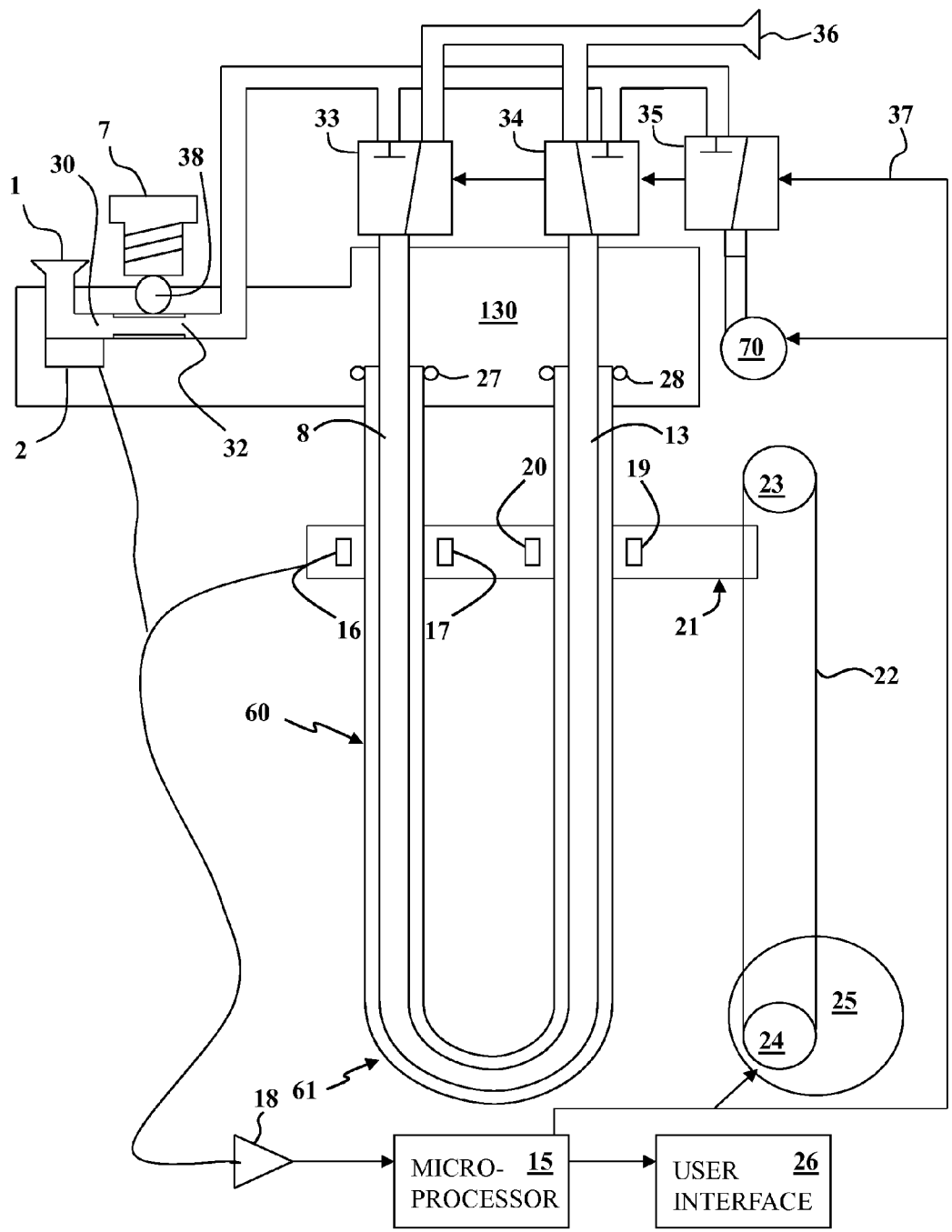
FIG. 2 depicts, in a functional arrangement, another exemplary apparatus embodiment of the present invention.

FIG. 2 depicts another exemplary embodiment of the present invention comprising two or more solenoid valves (33,34,35). In some embodiments, the solenoid valves (33, 34,35) may be three-way valves used to control fluid flow direction. In another embodiment, the valves may comprise four two-way valves (not shown). In an additional embodiment, the valve may be a single direction control valve (not shown). Fluid from a pump to be tested may enter a manifold (130) of the exemplary pump testing device through an inlet port (1). The fluid may then be ducted past a sensor (2), which may measure the pressure and/or temperature of the fluid.

The fluid may then be ducted to the inlet port of the occlusion valve (30), where the flow of fluid may be occluded. This may be accomplished by a pinching of an elastomeric occlusion tube (32) as a ball (38) is pushed to radially compress the occlusion tube (32) by a screw (7). In other embodiments, the fluid flow may be occluded by a valve, such as a solenoid valve. The amount of occlusion may be controlled manually, e.g., by tightening a screw with a screwdriver. In other embodiments, the amount of occlusion may be controlled by a microprocessor (15), e.g., by control signals (37) to a solenoid valve.

Fluid passing through the occlusion tube (32) may then be ducted to at least one solenoid valve (33,34). In one embodiment, two of these solenoid valves (33,34) may work in tandem. One of the valves may be configured by the microprocessor (15), via control signals (37), to send fluid to a U-shaped bubble tube (60). A second valve may be configured by the microprocessor (15), via control signals (37), to send fluid from the U-shaped bubble tube (60) to an outlet port (36).

When the device is first activated, it may enter a 'priming' mode. In the priming mode, the bubble tube (60) may be first filled with water and all the air in the device may be flushed out. This may be accomplished with fluid from the pump to be tested and/or from an external source.

A bubble pump (70) may be used to introduce bubbles into the fluid stream via a solenoid valve (35). The solenoid valve (35) may be configured by the microprocessor (15), via control signals (37). Fluid and bubbles may, for example, travel in a counter-clockwise or clockwise direction through the U-shaped bubble tube (60), depending on the configuration of the three-way solenoid valves (33,34) configured by the microprocessor (15), via control signals (37). Once a bubble is created by the bubble pump (70), it may be evaluated to make sure it is a good size and that there is only one bubble. Verifying the presence of a bubble may be accomplished by scanning, e.g., moving a carriage very quickly up and down the length of the bubble tube (60), one or more sides of the bubble tube (60) for the presence of one or more bubbles in the bubble tube (60). Once a bubble is detected, the fluid flow may be stopped so that the bubble dimensions may be more accurately measured. Accordingly, the device may determine if there is a detected bubble in an acceptable size range, the number of bubbles in the bubble tube (60), the sizes of each bubble detected in the bubble tube (60), and/or the spacing between any two detected bubbles. In some embodiments, a set bubble size for operation may be between 1.5-2 times the diameter of the bubble tube (60). Some detected bubbles may be too large or too small for operation, and may necessitate removing the bubbles from the bubble tube (60). In some embodiments, two or more bubbles may be acceptable for determining fluid flow via tracking if they are located an acceptable distance apart. For example, bubbles that are spaced too close together may merge to create a bubble that falls outside of an accepted size range for operation. Utilizing a bubble outside of the accepted size range may necessitate more rapid switching of the fluid flow direction to avoid losing the bubble, and this condition may be inefficient for power usage and/or accuracy.

If one or more bubbles are detected that fall outside a set range, the device may track the trailing edge of the rearmost bubble, i.e., closest to the fluid source, in the fluid flow and follow it out through the fluid flow to ensure that the bubble tube (60) does not contain any additional bubbles. In some embodiments, the device may conduct an additional search of the bubble tube once the rearmost bubble has exited the bubble tube, to ensure that no additional, previously undetected, bubbles remain. For example, a bubble may be contained outside the bubble tube or in a bend in a U-shaped bubble tube where it cannot be tracked by the device. To avoid removing a bubble that may become ideal for tracking, e.g., an undersized bubble that merges with another smaller bubble to fall within the size range, the device may wait for the bubble to move a set distance, e.g., a quarter of the distance of the bubble tube, before measuring the bubble dimensions.

Figure 4:
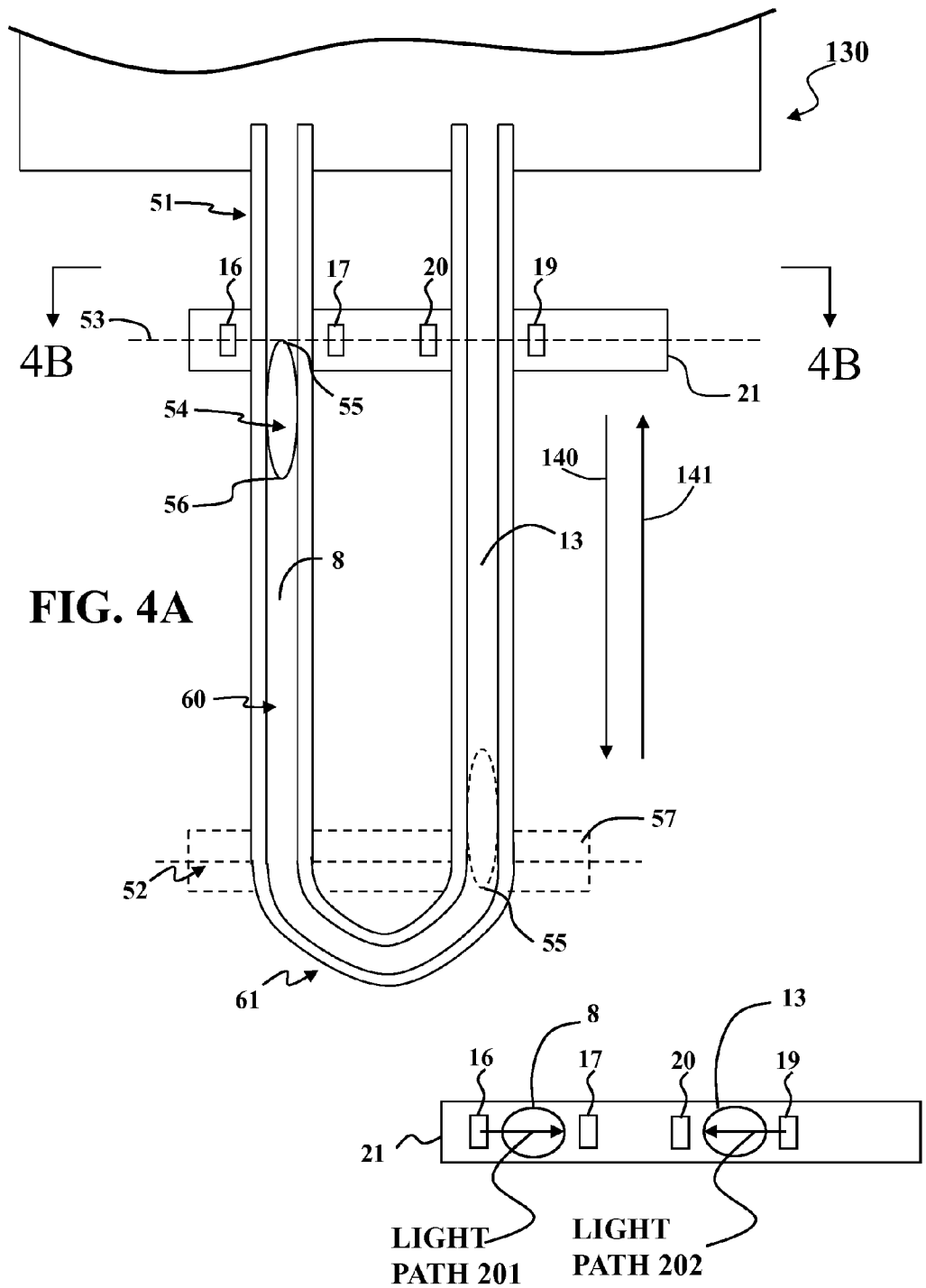
FIGS. 4A and 4B depict, in a functional arrangement, features of the exemplary apparatus embodiment of FIG. 1.

A carriage (21) may have apertures through which the conduit (60) may pass. FIG. 4B shows an orthogonal view of the carriage (21) where a first LED (16) may emit a first light path (201) that may be detected at a first photo-detector (17) after passing through the first leg (8) of the conduit (60), and where a second LED (19) may emit a second light path (202) that may be detected at a second photo-detector (20) after passing through the second leg (13) of the conduit. In some embodiments, there may be a photo-detector and LED on only one leg of the conduit (60).

Figure 3:
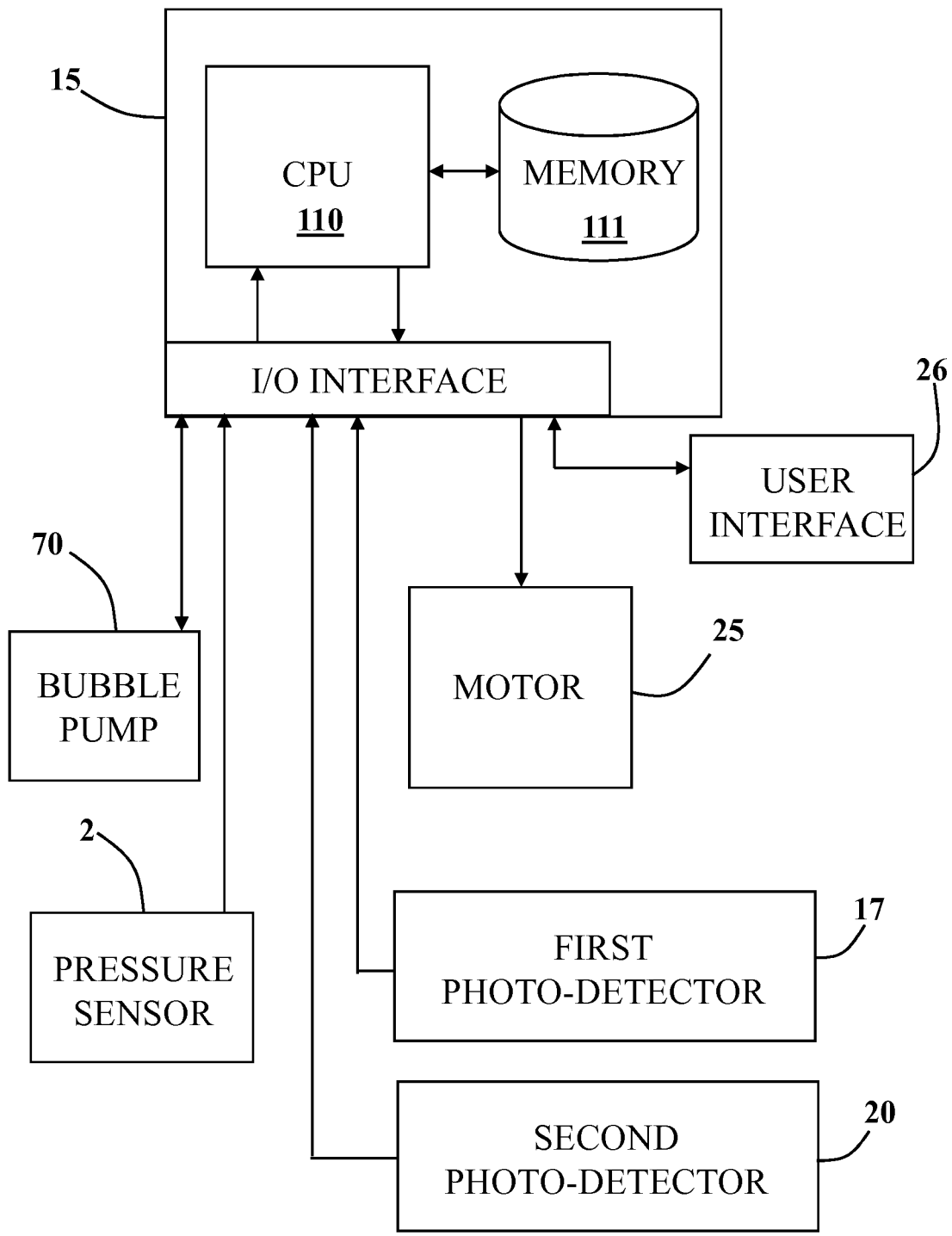
FIG. 3 depicts, in a functional block diagram, an exemplary apparatus embodiment of the present invention.

The presence of a bubble in the first leg (8) of the bubble tube (60) may be detected by a signal processing unit that may comprise circuitry and/or a microprocessor (15), having a central processing unit (110) and addressable memory (111), as seen in FIG. 3, when there are changes in the amount of output light of a first light-emitting device such as a first light-emitting diode (LED) (16) that is received by a first photo-sensor (17) and as amplified by the amplifier circuit (18). The presence of a bubble in the second leg (13) of the bubble tube (60) may likewise be detected by the microprocessor (15) by utilizing a second light-emitting device such as a second LED (19) and a second photo-detector (20) to detect changes in received output light from the second LED (19) that may be received by a second photo-detector (20) and amplified by the amplifier circuit (18) attributable to the presence of a bubble in the fluid stream.

In some embodiments, the LEDs (16, 19) and photo-detectors (17, 20) may be affixed to a movable carriage (21) that may be affixed to a drive unit, e.g., a drive belt (22), and the movable carriage (21) may be moved under the control of the microprocessor (15) by utilizing two or more pulleys (23,24) which may be driven by a stepper motor (25). For example, the stepper motor (25) may be under the control of the microprocessor (15) and the belt (22) may be driven by a drive pulley (24) engaged by the stepper motor (25).

In other embodiments, the presence of a bubble in the bubble tube (60) may be detected by a high resolution camera (not shown) or other imaging device. The imager may be mounted to a movable carriage (21) or may be stationary. A mirror, or other reflective device, may be used to redirect a light and/or imager. Multiple imagers may be used to detect and/or track the position of a bubble in the bubble tube (60) with a high degree of accuracy.

As the fluid moves through the first leg (8) and second leg (13) of the bubble tubes (60), one or more bubbles may be introduced via the bubble pump (70), and the motion of the bubble may be tracked by photo-detectors (17,20) on the carriage (21), a carriage that may be moved in various modes under the control of the microprocessor (15). The device may enter a 'scanning' mode during a start-up procedure. In the scanning mode, the carriage (21) may be rapidly moved from a bottom position to a top position while measuring and recording any bubbles detected in the bubble tube (60). This mode may be repeated until a bubble is measured and detected. Once a bubble is measured and detected, the device may enter a 'tracking' mode. In the tracking mode, the carriage (21) may closely follow a trailing edge or a leading edge of the bubble. In the tracking mode, the center of the optics, e.g., a light-emitting device or high-resolution imaging device, is kept closely aligned with an edge of the bubble in order to determine the flow rate of the fluid in the bubble tube (60). This allows the microprocessor (15), by executing computer-readable instructions, to measure the flow rate and volume delivered by the pump and to display that data along with the fluid temperature and pressure data on the display of a user interface (26), e.g., a display. During the 'priming' mode, a combination of the 'scanning' mode and the 'tracking' mode may be used. In some embodiments, these modes may be accomplished by a fixed imager or imagers, e.g., a high resolution camera or array of cameras.

The bubble tube (60) may be formed from a single glass tube that mates into the rest of the fluid ducting or manifold via O-rings (27, 28) in such a manner, as shown in cross-section in FIG. 1, that the bubble tube assembly may be easily pulled free from the rest of the fluid ducting (101, 102) for cleaning. Accordingly, the bubble tube (60) may be field serviceable by an end user rather than requiring factory cleaning and/or servicing. The bubble tube (60) may be cleaned with a specially designed mildly abrasive brush and accompanying cleaning fluid (not shown). In some embodiments, the bubble tube (60) may be linear. In other embodiments, the bubble tube (60) may be in a shape that allows for easy removal by a user from the manifold via O-rings for cleaning and/or servicing.

An anti-siphon valve (29) may be provided to preclude the effect of suction, i.e., a partial vacuum, that may be present in the tubing connected to the outlet port (14); a suction that may otherwise cause air to be drawn though the bubble pump valves (11,12).

In typical operation, bubbles and fluid travel down the first leg (8) of the bubble tube (60), and the carriage (21) may track the bubble, by translating with the bubble, until the bubble reaches the bend (61) in the tube. The carriage (21) may then pause in its translational motion proximate, in this example, to the bend (61) in the tube for the bubble to round the bend (61) and to travel into the second leg (13) of the tube (60) and then may track the bubble up the second leg of the tube (13). The steps of the stepper motor (25) may be made to be relatively small, e.g., smaller than the minimum possible spacing of multiple fixed photo detectors, the motion of the fluid may be tracked in fine resolution, and thereby allow for relatively precise flow and volume measurements that may be made rapidly, even at relatively low flow rates.

In some embodiments, the device may only track a bubble along one leg of the bubble tube (60) to avoid the lack of flow data caused while the bubble is going around the bend (61) in the tube. In embodiments with a U-shaped bubble tube (60) this tracking may occur on either leg of the bubble tube depending on the direction of flow through the bubble tube (60). In some embodiments, two or more bubbles may be used for tracking. It may be preferable to only track the bubble edge closest to the fluid source. An additional bubble interposed between a detected edge and a fluid source may cause the flow data for the detected edge to be distorted.

Due to the wide range of flow rates to be tested, multiple sets of computer-readable instructions may be required for tracking and measurement of bubble motion. Exemplary sets of computer-readable instructions are discussed below in conjunction with FIGS. 4A and 4B.

Sub-Process or Method 1: Ultra High Flow Rates

An exemplary first tracking method embodiment of the present invention may be embodied as an optional first sub-process, the carriage (21) may be placed at the topmost position (51) and a bubble (54) is introduced in the first leg (8) of the bubble tube (60). The carriage (21) may remain in position and the time interval—required for the bubble (54) to travel through the entire bubble tube (60) and be detected in the second leg (13) of the tube—is determined via measurements. If the bent portion (61) of the tube represents an unknown volume, there may be significant loss of accuracy. This potential inaccuracy may be automatically calibrated out, i.e., computationally accounted for, by positioning the carriage at a second position, P2, and measuring the total travel time. If the travel time at the top most position may be represented by $TT_{top-most}$, the travel time at the second position may be represented by $TT_{P2}$, and the difference in tube volume between the top most position and P2 may be represented by DeltaV, then it may be determined that the flow rate, R, is:

$$R = \text{Delta}V/(TT_{top-most} - TT_{P2}), \quad [\text{Eq. 1}]$$

and an estimate of the total tube volume, $V_{total}$, may be generated, including the bent portion, at:

$$V_{total} = R * TT_{top-most}. \quad [\text{Eq. 2}]$$

$V_{total}$ may be stored and used for further flow calculations. This process may be preferred for all flow rates in which the average flow rate cannot be accommodated by the motor's maximum speed.

Sub-Process or Method 2: Very Low Flow Rates.

An exemplary second tracking method embodiment of the present invention may be embodied as an optional second sub-process, the carriage (21) may be moved initially to its topmost position (51). Once the leading edge (56) of the bubble (54) is detected, or first detected, by the optics (16, 17) on the carriage (21), bubble tracking and measurement may begin. The carriage (21) may be moved, e.g., by the belt (22), as required to keep the leading edge of the bubble at or proximate the centerline (53) of the carriage's optics, where the carriage (21) is translated in a direction (140) away from the manifold (130). Flow rate and volume calculations may be updated each time the carriage is moved. When the carriage gets to its bottommost position (52) it may be returned, e.g., translated in a direction (141) to its topmost position to begin the process again. At very low flow rates, the system may track the bubble by tracking the leading edge (56) of the bubble (54) as it may be many minutes or even tens of minutes between the time the leading edge (56) of the bubble (54) first appears to the optics and the time the trailing edge (55) first appears to the optics.

Sub-Process or Method 3: Intermediate Flow Rates

An exemplary third tracking method embodiment of the present invention may be embodied as an optional third sub-process, the carriage (21) may initially be moved toward its topmost position (51). After the leading edge (56) of the bubble (54) is detected, or first detected, by the optics on the carriage, the carriage may remain in position until the trailing edge (55) of the bubble appears (FIG. 4A). Once the trailing edge (55) is detected, bubble-tracking and measurement taking may begin. The carriage may be moved in a direction (140) away from the manifold (130) as required to keep the trailing edge of the bubble (55) at the centerline (53) of the carriage's optics. Flow rate and volume calculations may be updated each time the carriage is moved. When the carriage reaches its bottom most position (52) it may pause in its translational motion until the bubble reappears in the second leg (13) of the bubble tube (60), and it then may track the bubble (54), e.g., according to its trailing edge (55), back up to the top most position (51) in a direction (141) toward the manifold (130) using, for example, the stepper motor (25) and belt (22) of FIG. 1. At intermediate flow rates the system may more accurately track the trailing edge (55) of the bubble (54) because there may be micro-bubbles or foam present in the tube ahead (i.e., below on the first leg, above on the second leg, if the device is oriented vertically) of the bubble. These micro-bubbles collect on the leading edge of the bubble, causing it to grow and accordingly may potentially cause overestimation of the flow rate.

Sub-Process or Method 4: High Flow Rates

An exemplary fourth method embodiment of the present invention may be embodied as an optional fourth sub-process, the carriage (21) may initially be moved to its topmost position (51). After the leading edge (56) of the bubble (54) is first detected by the optics on the carriage, the carriage may be moved at a relatively high speed or full speed (or slew rate) to then stop at its bottom most position (52). When the leading edge of the bubble (56) is detected at its bottommost position (52) flow rate and volume calculations may be updated based on the amount of elapsed time, e.g., the time increment required, for the bubble to travel from the top most position (51) to the bottom most position (52). The carriage may remain in position until the bubble reappears in the second leg of the bubble tube (13) and the process may be repeated in that tube. When the average flow rate is over about one-half of the maximum flow rate that may be supported by the maximum speed of the stepper motor, this exemplary fourth method may be a preferred method where several pumps, when placed in operation, may not produce a steady flow, but rather may produce a flow that surges, practicably instantaneously, above and below the average value. When the instantaneous flow rate surges above the motor's maximum speed, it may become impracticable for the carriage to instantaneously track the bubble; but the average rate, as represented by the top most position (51) to bottom most position (52) travel time, may still be measured when the instantaneous flow rate surges above the motor's maximum speed. In practice, there may be negligible loss in accuracy when executing this fourth exemplary method, and at these relatively high flow rates, measurements may still be produced rapidly relative to the other tracking methods, or sub-processes, disclosed.

Method of Switching Tracking Method

Figure 5:
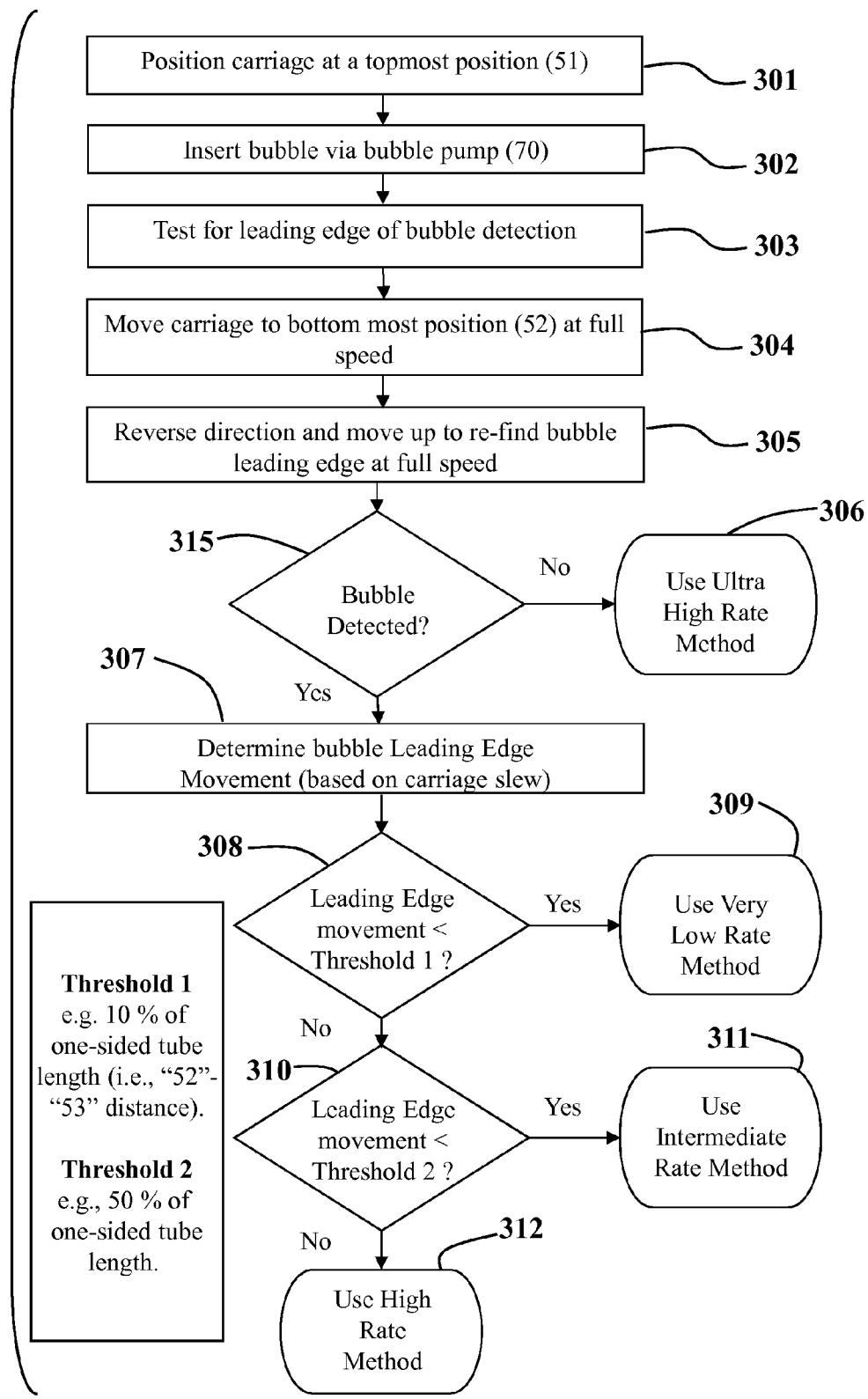
FIG. 5 is a top-level flowchart depicting a method embodiment of the present invention.

The various exemplary bubble tracking method embodiments, when selected, may be optimized for particular rates and for different rates. But, one may need to select the most accurate or quickest method of measure without advance knowledge of the rate. The method of switching tracking methods or optional tracking sub-processes, i.e., a method that provides for some or all of the methods as options, and provides for automated selection of tracking method (sub-process) is shown in the flowchart of FIG. 5. In some embodiments, the ultra high rate method may be termed the first tracking method, the very low rate method may be termed the second tracking method, the intermediate rate method may be termed the third tracking method, and the high rate method may be termed the fourth tracking method. The method of switching tracking methods (sub-processes) may be embodied as computer-readable instructions and executed via the microprocessor (15) of FIG. 3. Referring to FIGS. 1 and 5, one may position the carriage (21) at a topmost position (51) (step 301). A bubble may be inserted into the tube via a bubble pump (70) (step 302). The microprocessor, executing computer-readable instructions, may test for a detection of a leading edge of the inserted bubble (step 303). The carriage (21) may then be moved to a bottom-most position (52) at full speed (step 304). Upon achieving the bottom-most position (52), the direction of travel of the carriage (21) may then be reversed and the microprocessor executing computer-readable instructions may test for a detection of the leading edge of the inserted bubble (step 305). If the leading edge of the bubble is not detected (test 315), then the microprocessor may invoke the ultra-high flow rate processing (step 306). If the leading edge of the bubble is detected (test 315), then the microprocessor may determine the bubble leading edge movement based on carriage slew (step 307). If the determined leading edge is less than a first threshold (test 308), e.g., ten percent of the one-sided tube length, i.e., first leg, tube length, then the microprocessor may execute the steps of the very low rate method (step 309). If the determined leading edge is greater than or equal to the first threshold (test 308) and less than a second threshold (test 310), e.g., 50 percent of the one-sided tube length, i.e., first leg, tube length, then the microprocessor may execute the steps of the intermediate flow rate method (step 311). If the determined leading edge is greater than or equal to the first threshold (test 308), and greater than or equal to the second threshold (test 310), then the microprocessor may execute the steps of the high rate method (step 312).

Multiple Bubble Embodiments

Some embodiments of the present invention may utilize multiple bubbles simultaneously. An exemplary embodiment for determining a volume measurement using two bubbles is shown in FIGS. 6A-6G.

FIG. 6A shows a first bubble (80) introduced into the exemplary U-shaped tube (51) and the carriage (21) tracking the leading edge (81) of the first bubble (80). The leading edge tracking proceeds until the carriage (21) reaches a pre-determined location (111) as shown in FIG. 6B. Based on an event such as achieving a particular carriage location, e.g., drive belt travel or stepper motor increments, or based on a time difference, e.g., a bubble pump cycle, a second bubble (90) may be introduced to the exemplary U-shaped tube and the carriage switches to tracking the trailing edge (82) of the first bubble (80), as shown in FIG. 6C. The trailing edge (82) of the first bubble (80) is tracked until the carriage (21) reaches its bottom-most position (112), as depicted in FIG. 6D. From the bottom-most position, the carriage (21) is moved to the leading edge (91) of the second bubble (90) and the second bubble leading edge (91) is tracked as shown in FIG. 6E. The second bubble (90) leading edge (91) tracking continues until, as depicted in FIG. 6F, the leading edge (81) of the first bubble (80), having moved into the second leg (13) of the U-shaped tube, is detected by a second photo-detector (20) of the carriage (21). The leading edge (81) of the first bubble (80) or the leading edge (91) of the second bubble (90) may then be tracked up the second side (13) of the U-shaped tube until the carriage (21) reaches its upper most position (113) at which point a new first bubble (100) is introduced and the process repeats as depicted in FIG. 6G.

Synchronized Data Averaging

Figure 7A:
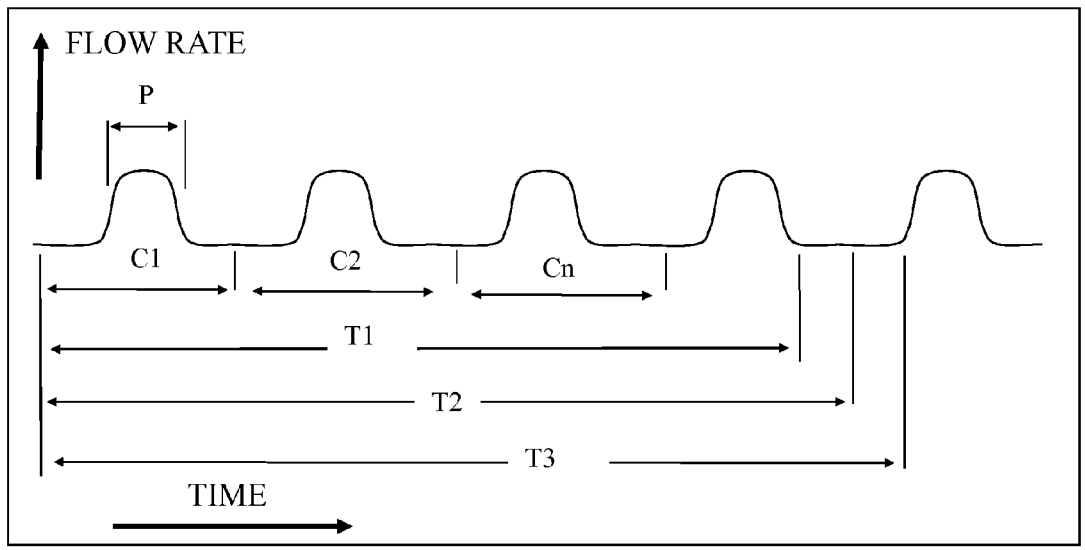
FIG. 7A depicts an exemplary pump cycle timeline.

Several medical pumps do not exhibit a steady, continuous flow. Rather, the flow exhibited is a periodic, pulsing flow. FIG. 7A shows the typical behavior of such a pump, with instantaneous flow plotted vs. time. The flow pattern consists of time periods in which the pump is pushing fluid of time P, and time periods where the pump is pausing of time C−P, in a total push+pause cycle time of C. Accordingly, FIG. 7A depicts an example of n+2 complete pump cycles. Typically the flow rate for such a pump is estimated as a continuously running average of the instantaneous flow rate. Whenever the running average contains anything other than an exactly even number of complete pump cycles it will be in error. For example, at the end of time interval T2 in FIG. 7A, the running average will show the correct average rate, but the end of time interval T1 is based on an erroneously high amount of push time and will provide for overestimate of the rate at the end of time interval T3 the average is based on an erroneously high amount of pause time and will provide for an underestimate of the rate.

If the true average rate is R, the worst case over-estimation, represented by R', is:

$$R'=R*C*(n+1)/(n*C+P) \qquad \text{[Eq. 3]}$$

Where the "n" of equation number 3 above is the number of complete cycles in the average, C is the length of the total push pause cycle, and P is the length of the push part of the push pause cycle.

While the worst case underestimation, represented by R", is:

$$R''=R*(1/(1+(C-P)/n*C)) \qquad \text{[Eq. 4]}$$

Figure 7B:
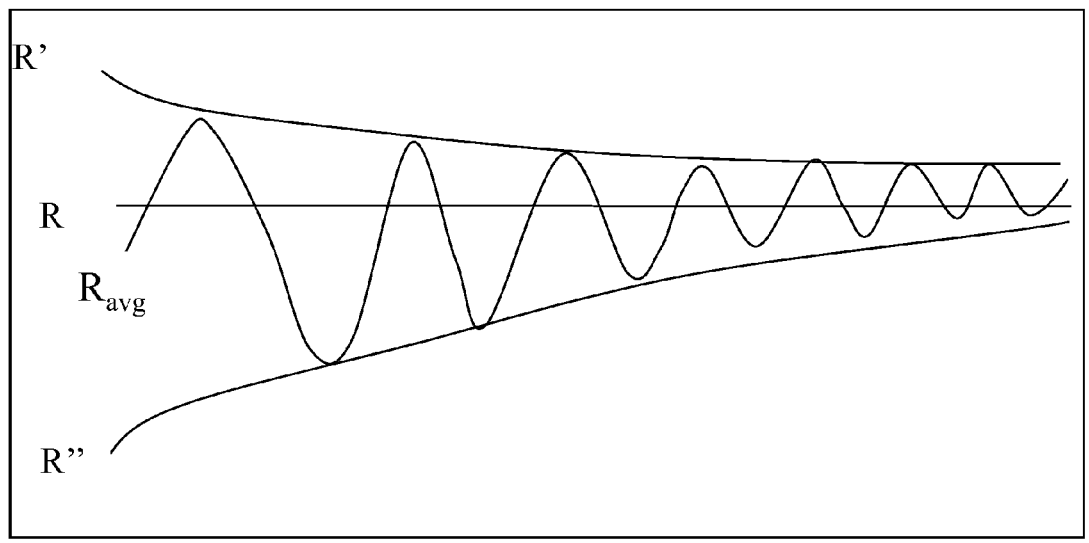
FIG. 7B depicts an exemplary running average timeline of an embodiment of the present invention.

FIG. 7B shows a cartoon of the running average, $R_{avg}$, oscillating between R' and R" and slowly converging on the presumed true average, R, and doing so as the number of complete cycles in the average, "n," increases.

FIGS. 8A-8E each depict exemplary bubble positions in another exemplary embodiment of the present invention allowing for reversible fluid flow. In FIG. 8A a bubble of air (54) is present in one leg of the bubble tube (60). The three-way valves (33,34) may be initially configured to admit fluid from an inlet port and into the right leg of the bubble tube and then exhaust fluid from the left leg of the bubble tube and out through an outlet port. In this configuration, the fluid to be tested may flow in a clockwise manner through the bubble tube. The upward motion of the bubble (54) through the left leg of the bubble tube follows the motion of the fluid. In some embodiments, a carriage (21) may be configured to remain in alignment with an edge of the bubble (54), moving with the bubble such that the movement of the carriage echoes the movement of the bubble, and thus the fluid. Since, the carriage (21) may be controlled by a microprocessor via control signals (See FIG. 3) to move with high precision, the motion of the fluid may be tracked in a very high resolution. Therefore, accurate flow and volume measurements may be made quickly, and even at low flow rates.

In FIG. 8B the bubble has reached an end point of the bubble tube and to avoid loss of the bubble, the three-way valves may be reconfigured in FIG. 8C such that fluid, and bubble, now flows counter-clockwise in the bubble tube. In this configuration, a first three-way valve (33) switches from exhausting fluid to inputting fluid and a second three-way valve (34) switches from inputting fluid to exhausting fluid. For example, fluid may flow in a clockwise direction (See FIG. 8A) when the first three-way valve (33) is energized, while the second three-way valve (34) remains de-energized. To stop the flow of fluid in the bubble tube (60) when the bubble (54) reaches an end point in the bubble tube (60) (See FIG. 8B), the first three-way valve (33) is de-energized, while the second three-way valve (34) remains de-energized. To start fluid flow in a counterclockwise direction (See FIG. 8C), the second three-way valve (34) is energized, while the first three-way valve (33) remains de-energized. If both three-way valves (33,34) are de-energized, then they may both be connected to a fluid input, and there is no fluid going to a fluid output. If both three-way valves (33,34) are energized, then they may both be connected to a fluid output, and no fluid input reaches the bubble tube (60). The motion of the fluid now pushes the bubble down, and the carriage may be reconfigured to follow the edge of the bubble down such that the movement of the carriage echoes the movement of the bubble. Thus, the fluid and the movement of the fluid may be evaluated in high resolution.

In FIG. 8D the bubble has reached the lower end of the left leg of the bubble tube and so in FIG. 8E the fluid direction is once again changed so that the process can repeat, returning to the FIG. 8A configuration.

FIG. 9A shows the motion of the bubble (54) in a configuration where two three-way valves (33,34) are configured to allow the fluid to flow through the bubble tube (60) in a counter-clockwise direction. The position of the upper end of the bubble (39) and the lower end of the bubble (40) are measured relative to a spatially fixed position, such as a distance from the manifold (See FIG. 2).

FIG. 9B shows a plot of the positions of the two ends of the bubble vs. time. In this configuration, the fluid is moving in a pulsatile pattern, which is comprised of periods where the fluid is moving rapidly, also known as "pushes" (41), and periods where the fluid is moving more slowly or not at all, also known as "pauses" (42). The true movement of the fluid is reflected in the movement of the upper edge (39) of the bubble (54) (See FIG. 9A). The movement of the lower edge (40) of the bubble (54) is different than the movement of the upper edge (39) of the bubble (54) in several ways: it is offset in position (43); and the inertia of the fluid below the bubble and the compressibility of the air in the bubble (54) may also introduce changes to the pattern of the movement, which may include a phase delay (44) and a rounding of the shape of the movement waveform (45).

As shown in FIGS. 8D-8E, once the bubble (54) reaches the bottom of its operable area, the three-way valves (33,34) may change the direction of the fluid flow from counter clockwise to clockwise. FIG. 9C shows the reconfiguration of the valves and the new direction of travel of the bubble and FIG. 9D shows the new movement patterns for the two edges (39,40) of the bubble (54). In FIG. 9D it is seen that the movement of the lower edge (40) of the bubble (54) may now more closely represent the true motion of the fluid. Additionally, the upper edge (39) of the bubble (54) is now the edge that has greater distortion in its movement pattern.

As the bubble (54) moves away from the manifold (See FIG. 2) it is the upper edge (39) that provides less distortion, and as the bubble moves towards the manifold, it is the lower edge (40) that provides less distortion. During movement of a bubble (54) having a leading edge and a trailing edge, tracking of the movement of the trailing edge in the present invention creates the closest representation of the true movement of the fluid. Tracking a single edge of the bubble (54) as it is moved up and down in a bubble tube (60) would combine distorted with undistorted fluid movement data and the result of combining this dissimilar data may create an unacceptable degree of error. Accordingly, when the bubble (54) direction is changed it is more efficient, e.g., more accurate results may be obtained, to also change the edge (39,40) of the bubble (54) being tracked so that in all cases it is the trailing edge of the bubble that is tracked and taken into consideration for the calculations of fluid motion.

The process of switching edges is shown in FIG. 10A. It relies on an additional configuration of the three-way valves. FIG. 9A shows the counter-clockwise valve configuration and FIG. 9C shows the clockwise valve configuration. In the new valve configuration shown in FIG. 10B, both ends of the bubble tube are connected to the outlet port, and flow from the inlet is blocked. This is the "blocked" valve configuration.

A top-level flowchart of the edge switch process is shown in FIG. 10A. Initially the trailing edge of the bubble is tracked until the bubble reaches an Optimal Direction Switch Point (step 441). Once the Optimal Direction Switch Point is reached, the valve control signals may be configured so that the valves are in a "block" configuration (step 442). The valves, however, do not react instantly to changes in their control signals so the trailing edge of the bubble may still be tracked (step 443) until such a time when the valves are known to be fully reacted. Accordingly, the valves may be switched one at a time. For example, switching from a clockwise fluid flow to a blocked position may switch one valve, and then switching from the blocked position to a counter-clockwise fluid flow may switch the other valve. Switching the valves one at a time may be advantageous as the valves may have uneven rates of switching, which could cause an unknown flow condition. FIG. 10B depicts an exemplary blocked valve configuration once the three-way valves (33, 34) have responded. Once the flow is known to be blocked, bubble edge tracking may be disengaged and the tracking carriage, or tracking point, may be moved through the air of the bubble and into the water on the other side of the bubble (step 444). Once the carriage, or tracking point, is moved into the fluid on the opposite side of the bubble, it may be moved an additional distance (step 445), which represents the maximum expected value of the carriage movement hysteresis. Once this additional distance is moved, the carriage direction, or tracking direction, may be switched and the carriage, or tracking, may be moved in the new direction to take up any hysteresis in the carriage positioning and find the new edge of the bubble (step 446) and bubble edge tracking may be engaged. Once the bubble edge tracking is engaged, the valves may be reconfigured such that fluid flow will push the bubble in the new direction (step 447). The process may be repeated in this new fluid flow direction, until another optimal direction switch point is reached (step 441).

Figure 11A:
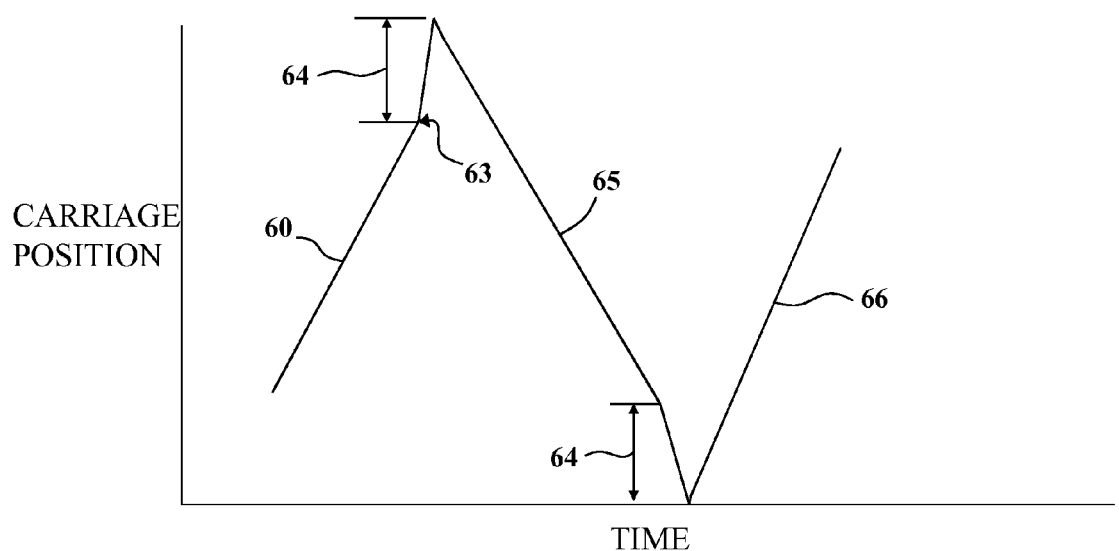
FIG. 11A depicts, in a plot of carriage position vs. time, the motion of a bubble in a steady pattern.
Figure 11B:
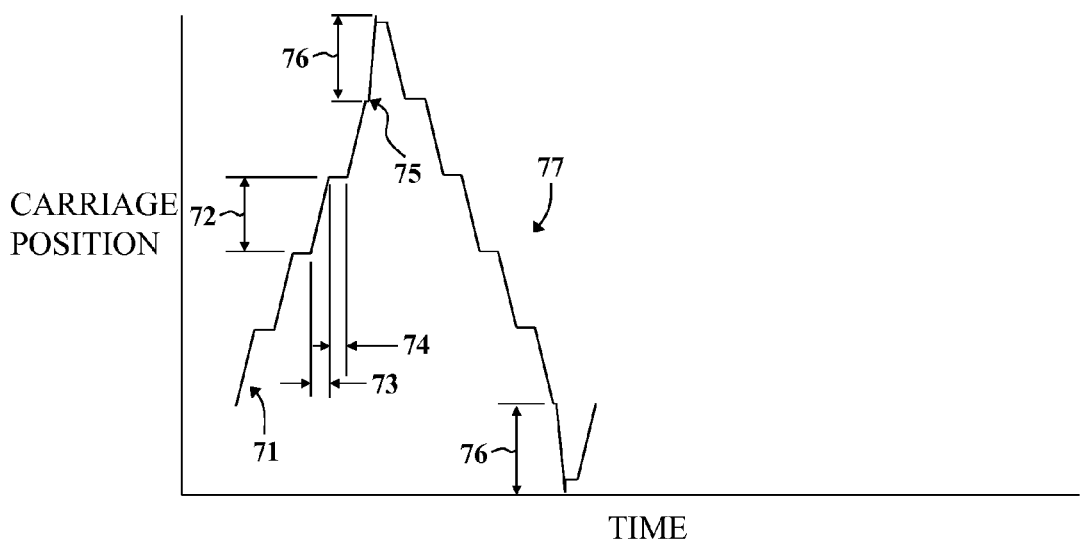
FIG. 11B depicts, in a plot of carriage position vs. time, the motion of a bubble in a pulsatile pattern.

FIGS. 11A-11B show a motion of the bubble tracking location, e.g., the carriage position, verses time. FIG. 11A shows the pattern for fluid moving in a steady pattern. In FIG. 11A, at region (60), the lower edge of the bubble is tracked as it is pushed upward towards the top of the bubble tube by the fluid flow. At location (63), the lower edge of the bubble has reached an Optimal Direction Switch Point, and the bubble direction switch may begin. The Optimal Direction Switch Point is the point where the bubble is a Direction Switch Margin (64) away from the end of the trackable area of the bubble tube. The Direction Switch Margin (DSM) may be represented as:

DSM=[(Bubble Size)*(Compressibility Allowance)]+ Hysteresis Take Up Margin+Water Detection Margin     [Eq. 5]

In Eq. 5, the Bubble Size is the previously measured size of the bubble. The Bubble Size may be measured before flow starts, when a user restarts the reading on the device. The carriage, or tracking point, may be moved from a bottom position of the bubble tube to a top position of the bubble tube at a rapid speed one or more times to gather an overall image of the bubble tube. This process may determine the number, measurement, and location of the one or more bubbles. Bubbles may also be re-measured during an edge switch. Compressibility Allowance is a factor that allows for the fact that bubble size may change during a reading due to changes in flow rates and back pressure. In some embodiments, Compressibility Allowance values in the region of 1.25 may be effective. Additionally, Hysteresis Take Up Margin is the maximum distance that might be required to take up any hysteresis caused by a direction change in the tracking mechanism. In some embodiments, the hysteresis margin may be determined heuristically as a function of the mechanism for moving the carriage, or tracking point. For example, the Hysteresis Take Up Margin may be effected by how the teeth of the belt fit into the teeth of the pulleys, the tension of the belt, and the tolerances of the carriage, or tracking point, in a translation movement relative to the bubble tube. The Hysteresis Take Up Margin may be a fixed value appropriate for all situations and may include a measured tolerance plus a safety margin. Water Detection Margin of Eq. 5 is the minimum amount of water that is necessary to assure that the top edge of the bubble has indeed been found. The Water Detection Margin may be related to the meniscus of the bubble and/or the noise on the fluid detection signal. The meniscus may make the signal rise in a relatively slow fashion near the end of a bubble. There may be some noise on the fluid detection signal, which may cause a misdetection, i.e., failed measurement, at the end or beginning of a bubble if a margin is not utilized.

After the fluid direction switch, tracking may resume in the opposite direction (65) using the upper edge of the bubble, until the bubble again reaches an Optimal Direction Switch Point (64), when the direction may again be switched and tracking may again resume in the first direction (66).

FIG. 11B shows a bubble tracking motion pattern for fluid moving in a pulsatile pattern. In region (71) the lower edge of the bubble is depicted as it is pushed upward toward the top of the tube by the fluid flow. Properties of the fluid motion may be extracted from the tracking data such as the typical fluid Push Size (72), the typical fluid motion Push Time (73), and the typical fluid motion Pause Time (74). Fluid direction switches involve briefly blocking the fluid flow. This blocking may cause the pressure of the incoming fluid to spike. If these spikes become large enough they may be detected by the pump being tested, which may cause it to shut down and abort the test. This problem may be exaggerated in the case of pulsatile pumps as the instantaneous flow rate in a pulsatile pump may be higher than the instantaneous flow rate in a steady flow pump at the same aggregate flow rate by a factor of push time and pause time over push time:

$$(\text{Push Time} + \text{Pause Time})/\text{Push Time} \quad [\text{Eq. 6}]$$

This factor may be typically around three, but may be ten or higher. Due to the aforementioned problem, it may be desirable to make direction switches during the Pause Times rather than during the Push Times. The Optimal Switch Point in this case may be when a pause at a location is detected, such that the next pause is expected to be closer than Direction Switch Margin (76) to the end of the tube. The Optimal Switch Point (75) may be found when a pause is detected and the remaining tube distance (76) is less than the push length (72) added to the direction switch margin (76):

$$\text{Remaining Tube Distance}(76) < (\text{Push Length}(72) + \text{Direction Switch Margin}(76)) \quad [\text{Eq. 7}]$$

If push sizes are inconsistent, then as each Push Length is measured it may be compared with a Maximum Push Length and the Maximum Push Length may be replaced if the new Push Length is larger. In this case, the Optimal Switch Point (75) may be found when it is detected that a pause in the Remaining Tube Distance (76) is less than a Maximum Push Length (72) plus the Direction Switch Margin (76)):

$$\text{Remaining Tube Distance}(76) < (\text{Maximum Push Length}(72) + \text{Direction Switch Margin}(76)) \quad [\text{Eq. 8}]$$

Figure 12:
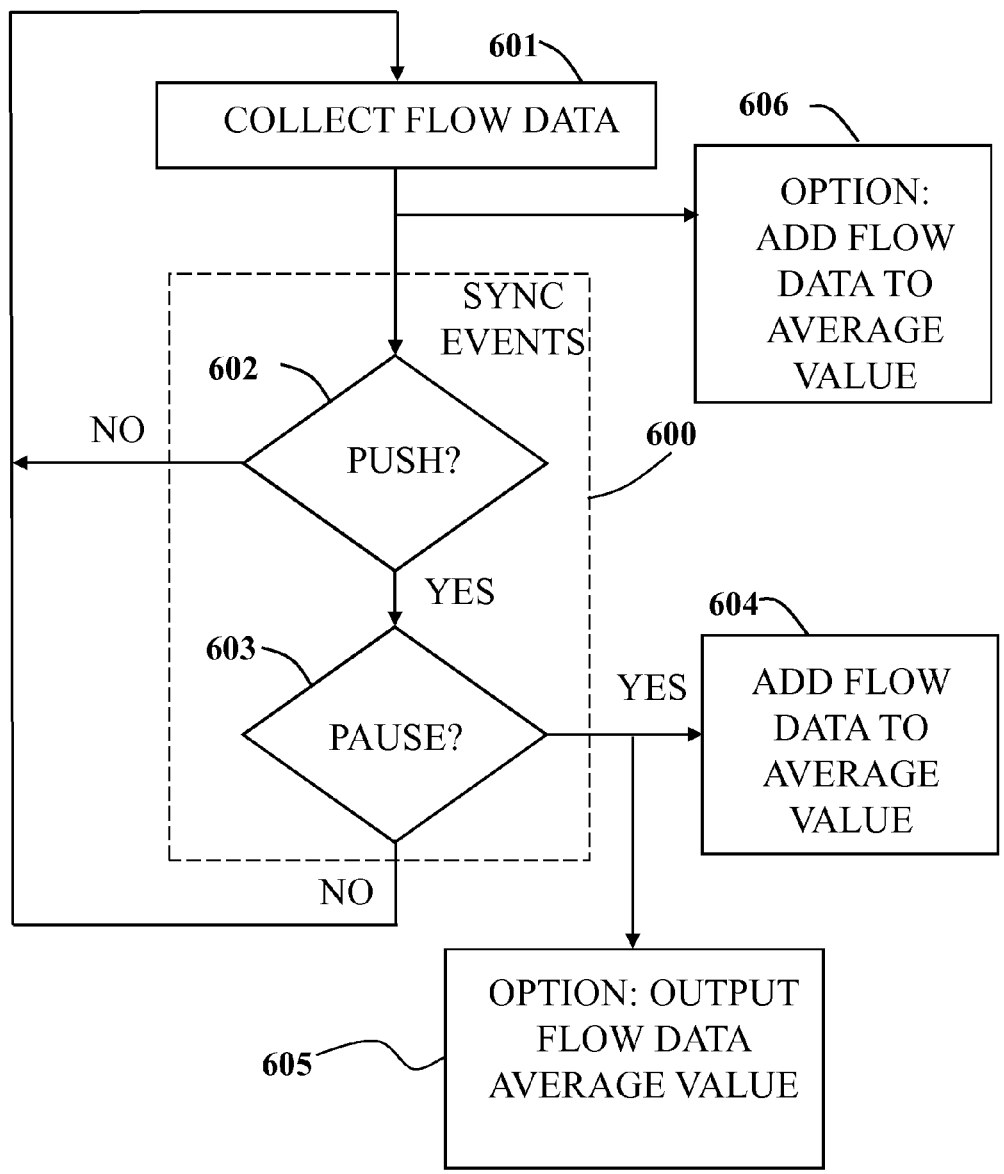
FIG. 12 is an exemplary top-level flowchart of an exemplary embodiment of the present invention.

In several applications, it may be desirable to measure flow rate to within a 1% error. For several pumps, a target error of less than 1% requires an "n" value of several hundred. This large number of cycles may require a total test length of several minutes to several hours, which may be impractical for time-constrained testing of a pumping device. Accordingly, a method embodiment of the present invention, depicted by the flowchart of FIG. 12, may provide for fluid flow rate estimation of a pump where the exemplary method comprises the steps of: (a) detecting a periodic synchronization event (600), via inserted bubble tracking of a signal processor unit comprising a central processing unit and addressable memory; and (b) synchronizing a flow characteristic calculation based on the periodic synchronization event. The signal processor unit may comprise circuitry and/or a central processing unit and addressable memory, where the central processor executes computer-readable instructions to execute the method. A periodic synchronization event (600) may be at a point or range along the push/pause cycle and may be tied to push/pause detection. An exemplary flow characteristic may be the average push volume per average time between pushes. For example, a synchronization event may be detected that indicates the present point or range in the push/pause cycle, e.g., the transition between the push time-region and the pause time-region, and sensor data, e.g., carriage location or rate information and/or fluid pressure in the conduit, may be input to the averaging process based on the detection of the synchronization event. In another example, the sensor data may be input in an averaging process at a sampling rate (606), but the result of the averaging process (605) may only be made available for output and/or display on the detection of a synchronization event. In another example, the flow characteristic may be expressed via a mathematical model representative of the average push length and a mathematical model representative of the average time between pushes, and the flow characteristic, as a pair of mathematical models, may be updated on the detection of a synchronization event.

Detections of periodic synchronization events may be based on time derivatives of carriage position changes, carriage linear velocity changes and/or may be based on changes in fluid pressure in the conduit or one or more time derivatives of fluid pressure changes in the conduit. An exemplary embodiment of the present invention may comprise the steps of a circuit and/or a microprocessor configured to: (a) detect pushes of a pump as a time of elevated and consistent carriage motion—reflective of bubble tracking; (b) detect pauses in the pumping as time-intervals where there is negligible carriage motion or where there is carriage motion less than some percentage of that detected during pushes; (c) collect measured and/or determined flow data through the push-pause cycle; and (d) add the collected flow data to an average value only when a pause is detected following a push detection. A microprocessor (15) of an exemplary embodiment of the present invention may execute computer-readable instructions for a test based on tracking leading or trailing portions of one or more induced bubbles according to an exemplary process depicted in the flowchart of FIG. 12 where the flow data is collected (step 601), a test may indicate that the pump is in a pause phase of a push-pause cycle (synchronization events 600), i.e., a pause is detected (test 603) following a push detection (test 602), and, if in a pause phase, then adding flow data to the average value (step 604). Embodiments of the exemplary detected pump pause-based method produce test-wise acceptable flow rate numbers with "n" values in the range of two to ten.

In some cases optimal results may be achieved typically by combining the above exemplary synchronized averaging method with the multi-bubble application to a flow tube. In this combined embodiment, new bubbles are introduced and flow data are added to the average value only when a pause is detected following a push detection.

Figure 13:
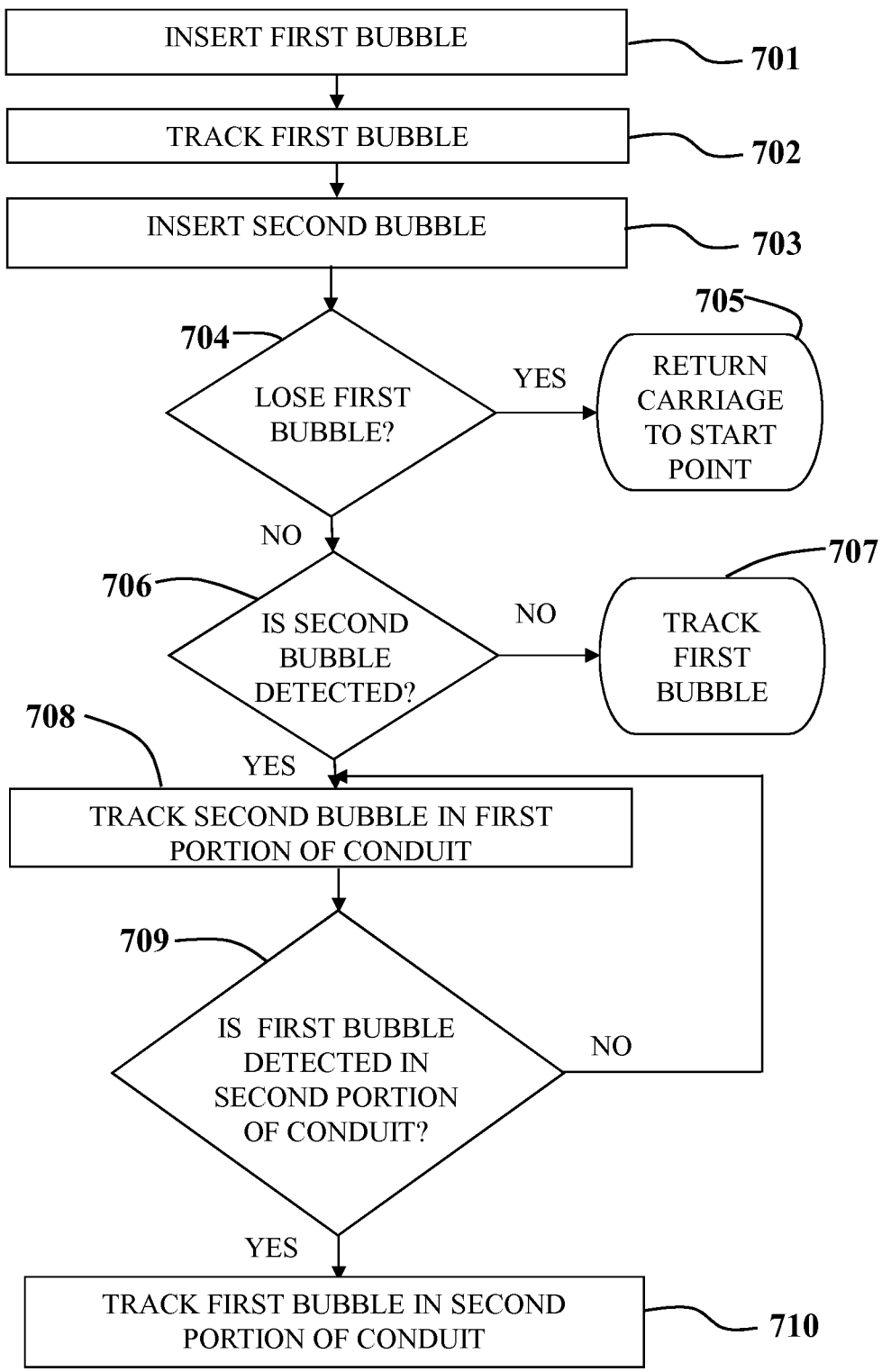
FIG. 13 is an exemplary top-level flowchart of an exemplary embodiment of the present invention.

FIG. 13 is a flowchart described with reference to FIGS. 6A-6G, where FIG. 13 is an example of the steps that may be executed by a computer executing computer-readable instructions to track a plurality of inserted bubbles in which a first bubble is inserted (step 701) into the first portion of the conduit and the first bubble is tracked (step 702), i.e., the carriage having a photo detector may be translated as the bubble moves based on received levels of carriage-based lights emissions. Then a second bubble is inserted (step 703) into the invention and a check is made as to the location of the first bubble (test 704). If the first bubble is lost, e.g., due to carriage travel limitations or a loss at tracking, the carriage returns to a starting point (step 705) and the process begins again for the next bubble. If the first bubble is not lost, then a check is made as to the location of the second bubble (test 706) and if the second bubble is lost, then the carriage gets moved back to the first bubble and it is tracked (step 707). If the second bubble is detected (test 706), then the second bubble is tracked in the first portion of the conduit (step 708), i.e., along the outflow direction. A check is then made to determine if the first bubble is detected in the second portion of the conduit (test 709), i.e., along the inflow direction. If the first bubble is determined to be in the second portion of the conduit, then the first bubble is tracked in the second portion of the conduit (step 710). If the first bubble is determined not to be in the second portion of the conduit (test 709), then the process returns to tracking, or continues to track, the second bubble in the first portion of the conduit (step 708). The process may be repeated for a plurality of bubbles.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A method of measuring fluid flow, the method comprising:
   initiating a fluid flow in a conduit and in a first direction;
   tracking, by a signal processing unit, a travel of an edge of a bubble present in the fluid flow and moving in the first direction;
   stopping the fluid flow;
   initiating the fluid flow in a second direction, wherein the second direction is a direction that is a reverse direction of the first direction; and
   tracking, by the signal processing unit, a travel of the edge of the bubble present in the fluid flow and moving in the second direction.

2. The method of claim 1 wherein the tracking is by way of measuring the position of the bubble present in the fluid flow.

3. The method of claim 1 wherein stopping the fluid flow further comprises:
   closing at least one valve disposed between an input flow and an output flow.

4. The method of claim 3 wherein the at least one value is a three-way valve.

5. The method of claim 1 wherein:
   initiating the fluid flow in the first direction is via energizing a first valve;
   stopping the fluid flow is via de-energizing the first valve; and
   initiating the fluid flow in the second direction is via energizing a second valve.

6. The method of claim 1 wherein tracking the travel of the edge of the bubble is by a moveable carriage, the moveable carriage comprising at least one light emitting unit.

7. The method of claim 6 wherein the moveable carriage further comprises at least one photo-receptor, the photo-receptor configured to receive light emitted by the at least one light emitting unit.

8. The method of claim 7 wherein tracking the travel of the edge of the bubble is by keeping a center point of the moveable carriage aligned with a trailing edge of the bubble.

9. The method of claim 8 wherein the trailing edge of the bubble is determined as the edge of the bubble closest to the fluid source.

10. The method of claim 7 wherein tracking the travel of the edge of the bubble is by keeping a center point of the moveable carriage aligned with a leading edge of the bubble.

11. The method of claim 10 wherein the leading edge of the bubble is determined as the edge of the bubble farthest to the fluid source.

12. The method of claim 1 wherein tracking the travel of the edge of the bubble is by tracking a trailing edge of the bubble via a high-resolution image capturing device.

13. The method of claim 1 wherein tracking the travel of the edge of the bubble is by tracking a leading edge of the bubble via a high-resolution image capturing device.

14. The method of claim 1 further comprising:
   detecting, via scanning a portion of the conduit, the presence of one or more bubbles in the conduit;
   stopping the fluid flow if one or more bubbles are detected in the conduit; and
   determining, based on the detected one or more bubbles, at least one of: a number representing a total of the one or more bubbles in the conduit; a size of each bubble of the one or more bubbles in the conduit; and a location corresponding to each bubble of the one or more bubbles in relation to other detected bubbles.

15. The method of claim 14 further comprising:
   determining the presence of one or more bubbles in the conduit based on a predefined size threshold;
   if the one or more detected bubbles have a size outside the predefined size threshold then removing the one or more bubbles from the conduit.

16. A pump tester comprising:
   a light-transmissive fluid conduit;
   at least one valve disposed between a fluid inlet port and the light-transmissive fluid conduit;

at least one imager configured to image at least a portion of the light-transmissive fluid conduit; and a signal processing unit comprising a central processor and addressable memory, the signal processor configured to:

output a signal to the at least one valve to effect at least one of: (i) fluid flow from the inlet port through the at least one valve and into the light-transmissive fluid conduit in a first fluid flow direction, (ii) fluid flow blocked in the light-transmissive fluid conduit by the at least one valve, and (iii) fluid flow from the inlet port through the at least one valve and into the light-transmissive fluid conduit in a second fluid flow direction, wherein the second fluid flow direction is a reverse direction of the first fluid flow direction; and output a signal to the at least one imager to effect at least one of: (i) tracking a travel of an edge of a bubble in the light-transmissive fluid conduit moving in the first fluid flow direction; (ii) switching a tracking position to an opposite side of the bubble when the fluid flow is blocked; and (iii) tracking the travel of the edge of the bubble in the light-transmissive conduit moving in the second fluid flow direction.

17. The pump tester of claim 16 wherein the edge of the bubble is closest to the fluid source.

18. The pump tester of claim 17 wherein the light-transmissive fluid conduit is a U-shaped conduit having a first leg and a second leg, wherein an open end of the first leg and the second leg of the U-shaped conduit are configured to mate into a manifold on the pump tester via two or more O-rings, and wherein the U-shaped conduit may be removed for cleaning.

* * * * *